US009015098B1

(12) United States Patent
Crosley

(10) Patent No.: US 9,015,098 B1
(45) Date of Patent: Apr. 21, 2015

(54) METHOD AND SYSTEM FOR CHECKING THE CONSISTENCY OF ESTABLISHED FACTS WITHIN INTERNAL WORKS

(75) Inventor: Jay A. Crosley, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 236 days.

(21) Appl. No.: 13/487,812

(22) Filed: Jun. 4, 2012

(51) Int. Cl.
*G06F 17/30* (2006.01)

(52) U.S. Cl.
CPC ............................ *G06F 17/30702* (2013.01)

(58) Field of Classification Search
USPC ................................................ 704/9; 706/46
See application file for complete search history.

(56) References Cited

U.S. PATENT DOCUMENTS

| | | | |
|---|---|---|---|
| 7,013,308 B1 * | 3/2006 | Tunstall-Pedoe | 707/709 |
| 7,313,515 B2 * | 12/2007 | Crouch et al. | 704/9 |
| 7,509,258 B1 * | 3/2009 | Roy | 704/256 |
| 7,844,466 B2 * | 11/2010 | Roy | 704/275 |
| 8,121,973 B2 * | 2/2012 | Anderson et al. | 706/62 |
| 8,249,881 B2 * | 8/2012 | Roy | 704/275 |
| 8,682,674 B1 * | 3/2014 | Komissarchik et al. | 704/270 |
| 8,838,659 B2 * | 9/2014 | Tunstall-Pedoe | 707/899 |

* cited by examiner

*Primary Examiner* — Susan McFadden
(74) *Attorney, Agent, or Firm* — Athorus, PLLC

(57) ABSTRACT

Systems and methods for checking the consistency of established facts within internal works according to the present disclosure operate by identifying established facts within the internal works and determining whether any of the established facts are contradictory to one another. Facts may be established and conflicts may be identified by any means, such as by determining associations between words of the internal work, or by consulting one or more external resources. If a contradiction between established facts is identified, then an author of the internal work or other user may be notified, and a change to the internal work may be recommended to the author or user, or requested from the author or user.

20 Claims, 11 Drawing Sheets

INTERNAL WORK ⎯310

Steven was always a <u>tall child</u>, the ⎯312
tallest student in his class. He played ⎯314
varsity basketball for four years and ⎯316
was the team's <u>starting center</u>. ⎯318

• 
• 
•

Steven met his fiancée at the mall,
where she worked as a clerk at a <u>Big &</u>
<u>Tall Man's store</u>, as he was buying his ⎯320
favorite brand of <u>size 13 shoes</u>. ⎯322

•
•
•

330
Steven's favorite piece of clothing was a
Grateful Dead T-shirt, <u>size small</u>, that he
purchased at a concert at the Meadows
Music Theatre in 1994, when <u>he was 20.</u>
⎯330

ESTABLISHED FACTS ⎯350

STEVEN IS TALL. ⎯352
STEVEN IS TALL. ⎯354
STEVEN IS TALL. ⎯356

STEVEN IS TALL. ⎯358

STEVEN IS TALL. ⎯360

STEVEN IS TALL. ⎯362

STEVEN IS SHORT. ⎯370

FIG. 3

INTERNAL WORK — 710

2

Some of Bryon's fondest memories of his childhood involved sitting on the back porch beneath the thick, shady ash trees that had lined his family's property for centuries. The tall trees kept Bryon's porch cool in the summer, and their leaves faded from a flat green to a bold yellow, and then to unforgettable red and purple hues, as the fall wound down unto winter. The ash trees also stayed strong throughout even the deepest snowfalls before turning back to green each year with the onset of spring.

- 
- 
-

315

Bryon took his fifteen-year-old son to Game 7 of the 2001 World Series, where they sat in the front row as the Yankees fell to the Diamondbacks. Mariano Rivera's twenty-eighth pitch shattered Luis Gonzalez's bat into ash splinters that fluttered across the Arizona desert, but Gonzalez got just enough of the ball to loft a weak single over second base and into the history books as the Yankees lost the World Series for the first time in thirty years.

ESTABLISHED FACTS — 750

LOCATION: PAGE 2 — 760

CONTEXT: CHILDHOOD MEMORY — 762

FACT: ASH TREES ARE THICK — 764

FACT: ASH TREES ARE STRONG — 765

FACT: ASH TREES ARE DURABLE — 766

FACT: ASH TREES ARE STRONG — 767

FACT: ASH TREES ARE DURABLE — 768

LOCATION: PAGE 315 — 770

CONTEXT: ADULTHOOD MEMORY — 772

FACT: YANKEES LOST 2001 WORLD SERIES — 774

FACT: BROKEN BAT — 775

FACT: BATS ARE MADE OF ASH — 776

FACT: ASH IS BRITTLE — 777

FACT: YANKEES LOST 1981 WORLD SERIES — 778

FIG. 7

David passed the Series VII exam on March 27, 1998. —942

Precisely one year later, to the day, the Dow Jones Industrial —944
Average closed above 10,000 points for the first time in history. —946

CONTRADICTION ALERT —950

THE FOLLOWING DISCREPANCIES WERE NOTED:
- MARCH 27, 1999 WAS A SATURDAY —960
- WALL STREET TRADING FLOORS ARE CLOSED ON SATURDAYS —962
- THE DOW JONES CLOSED ABOVE 10,000 POINTS FOR THE FIRST TIME ON MARCH 29, 1999 —964

SPECIFY SOURCES

THE FOLLOWING SOURCES MAY BE RELIED ON TO IDENTIFY CONTRADICTIONS AND RECOMMENDED RESOLUTIONS: —912

- 920 ☐ CALCULATOR
- 922 ☒ CALENDAR
- 924 ☐ DICTIONARY
- 926 ☒ ENCYCLOPEDIA
- 928 ☐ THESAURUS

[OK] —914  [CANCEL] —916

FIG. 9A

METHOD AND SYSTEM FOR CHECKING THE CONSISTENCY OF ESTABLISHED FACTS WITHIN INTERNAL WORKS

BACKGROUND OF THE INVENTION

Modern word processing programs and other like applications frequently include features for checking the spelling and grammar of text set forth within internal works, which may include documents or texts of any kind. At a basic level, software applications for checking the spelling of words within a body of text, sometimes called "spell checkers" or "spell checks," typically operate by comparing a word typed by a user against a set of correctly spelled words, such as an online dictionary. If a typed word does not correspond to any of the words in the set, the typed word may be underlined, highlighted or otherwise identified to the user as misspelled and, in some instances, an alternate spelling for the typed word may be suggested. Likewise, software applications for checking the appropriateness of grammar within a body of text, or "grammar checkers," typically operate by evaluating punctuation, diction, styles and other features of words, phrases and sentences within the body of text, identifying potentially erroneous uses of grammar or syntax, and suggesting alternate word choices or phrase and sentence structures to the author.

While spell checkers and grammar checkers are helpful for verifying the typographical or grammatical correctness of a body of text within a document, such as by comparing a word or group of words against a set of rules or guidance established by or within an external source, such checkers and other like applications are powerless where an error in a body of text is based not on specific errors in spelling or prose, but on inconsistencies between statements of fact made in different portions of the body of text. For example, where a first fact is established in an early portion of a document (such as a short story, a movie script or a news article), and a second fact that contradicts the first fact is established in a later portion of the document, existing systems and methods for checking the text of the document, such as spell checkers or grammar checkers, are generally unable to identify the contradiction. If the words used by the author of the document to establish the first fact and the second fact are correctly spelled, and proper grammar is employed, the contradiction will go entirely unnoticed.

It is believed that existing systems and methods for preparing, evaluating and/or publishing an internal work are unable to check the contents of the document to identify facts that are established therein, to identify any discrepancies between two or more of the established facts within the internal work, or to suggest any alterations or modifications to one or more portions of the internal work in order to address any such discrepancies.

The systems and methods of the present disclosure are intended to address one or more of the foregoing deficiencies and limitations, and others that may be expressly or implicitly present in the prior art.

BRIEF DESCRIPTION OF THE DRAWINGS

FIG. 3 is a block diagram of an internal work and established facts within internal works identified therein, in accordance with embodiments of the present disclosure.

FIG. 7 is a block diagram of an internal work and established facts within internal works identified therein, in accordance with embodiments of the present disclosure.

FIGS. 9A and 9B are user interfaces utilized by or in accordance with methods and systems for checking the consistency of established facts within internal works, in accordance with embodiments of the present disclosure.

DETAILED DESCRIPTION

Figure 1:
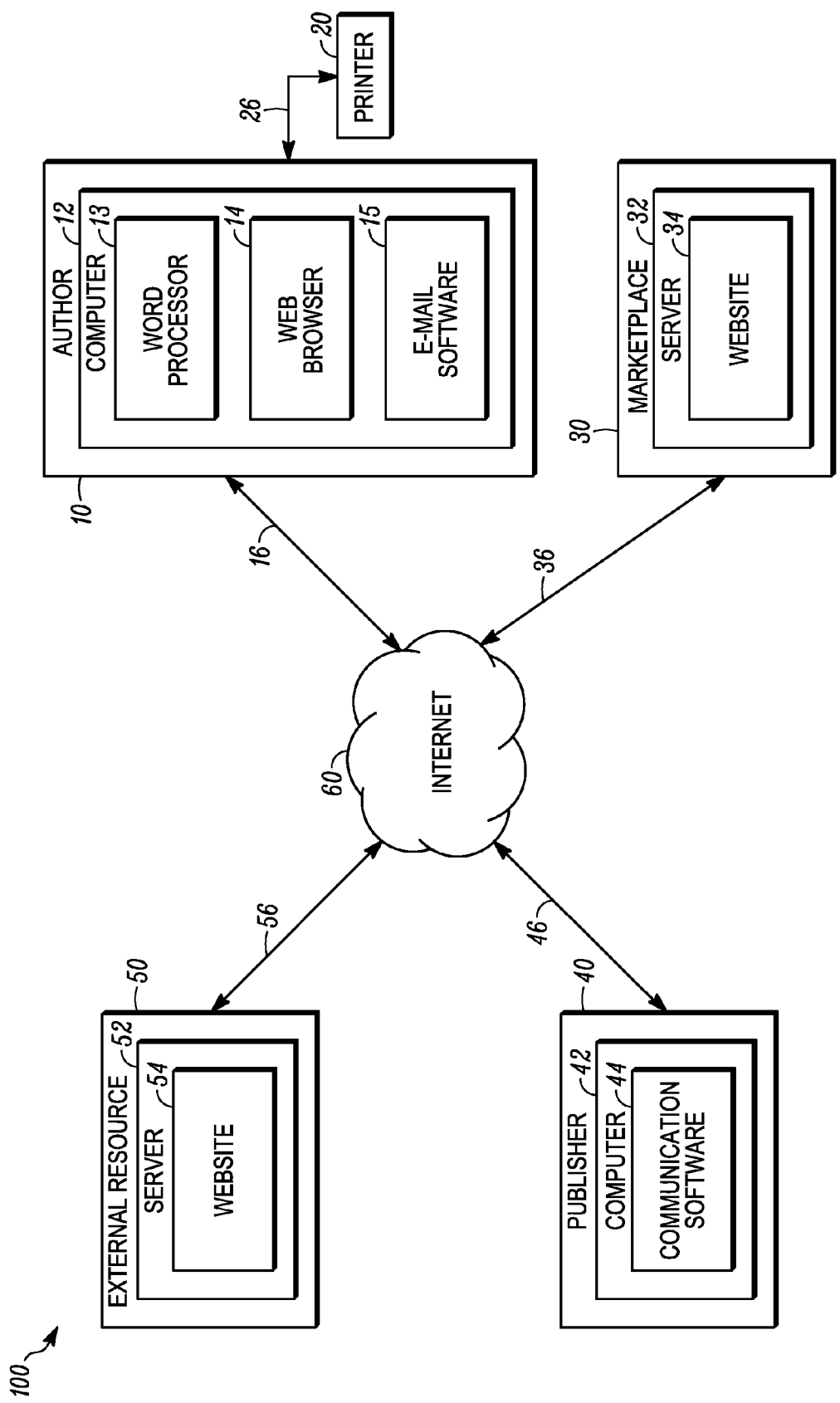
FIG. 1 is a block diagram of the components of a method and system for checking the consistency of established facts within internal works, in accordance with embodiments of the present disclosure.

As is set forth in greater detail below, the present disclosure is directed to systems and methods for checking the consistency of established facts within internal works, such as documents that are prepared for any reason using word processing software or other like applications. Specifically, the present disclosure includes systems and methods that identify, receive or otherwise obtain an internal work; analyze the internal work to identify facts that are established therein; and search the internal work to determine whether there are any discrepancies between the established facts.

The systems and methods of the present disclosure may include free-standing hardware components or software applications that may be stored on such components or one or more computer-readable media that may be accessed by a computing device. Alternatively, the systems and methods of the present disclosure may be an addition or attachment to existing hardware components or software applications, such as a "plug-in" to existing systems and methods, i.e., word processors, electronic mail clients, or other systems and methods for generating, evaluating, publishing or distributing internal works. Furthermore, as with existing spell checkers and grammar checkers, the systems and methods of the present disclosure may check the consistency of established facts within internal works manually, automatically, or both manually and automatically. For example, the systems and methods of the present disclosure may operate on or in connection with a word processing application as an internal work is being generated, i.e., by running in the background as a document is being typed. Alternatively, the systems and methods of the present disclosure may evaluate a completed internal work, i.e., prior to its publication or release. The systems and methods of the present disclosure may also check the consistency of established facts within the internal work at the direction of a user, such as by selecting an option from a drop-down menu or list, and may also operate in parallel with a traditional spell checker or grammar checker.

The systems and methods of the present disclosure may be utilized to analyze certain types of established facts within an internal work. For example, a user may request that specific facts, such as names, dates or any other type of fact established within an internal work be evaluated for consistency, and that any other specific facts may be ignored or bypassed in such an evaluation.

The systems and methods of the present disclosure may also be instructed to analyze an entire internal work, or, alternatively, selected portions of an internal work. For example, where a piece of historical fiction includes a background based on real, historical facts and occurrences, and a plot based on fictional events that have been created by the author, the systems and methods of the present invention may analyze only the background of the internal work, as designated or selected by the author or another authorized user, for consistency of established facts. The portions of the internal work to be analyzed may be selected manually by the author or another authorized user, or automatically by the systems and methods of the present disclosure.

Moreover, separate portions of an internal work may be analyzed subject to separate standards, according to the systems and methods of the present disclosure. For example, the systems and methods of the present invention may automatically locate or predict a location or portion of an internal work at which a progression of established facts or plot arc change, i.e., an inflection point, and may analyze portions of the internal work prior to and subsequent to that location subject to different standards. As yet another example, an author of a fictional work in which a character intentionally tells a lie, e.g., a story regarding a car accident at an intersection where the traffic light was green, and the character intentionally states that the traffic light was red, the author may exempt the portions of the fictional work where the character lies from a consistency analysis.

The establishment of facts within an internal work may be accomplished by any means and on any basis, according to the systems and methods of the present disclosure, such as through the use of any known system or method for determining or identifying associations between a pair of words, or two or more words. Where a phrase includes a word and a modifier (such as a clause, another phrase or another word), the phrase may establish a fact about the word that is based on or includes the modifier. In the most basic instance, an adjective applied to a noun generally established a fact relating to the adjective and regarding the noun. For example, where an internal work refers to the word pair "yellow crayon," one established fact in the internal work is that the crayon is yellow. Therefore, in connection with a word pair of $adjective_1 \cdot noun_1$ in an internal work, it may be determined that $adjective_1$ applies directly to $noun_1$.

Additionally, established facts may be deduced or estimated based on not only on the actual words used in an internal work but also on words that are related to or associated with the actual words used in the internal work. For example, where an internal work refers to the word pair "popular album" with respect to a given time, one established fact is that the album in question was popular at that time. Other established facts may include that the songs included on the album were popular in that time; that the artist on the album was popular at that time; or that the style of music included on the album was popular at that time. Similarly, where an internal work refers to a "run-down neighborhood," some established facts may include that the homes in the neighborhood are dilapidated, the parks in the neighborhood are unsafe or that the streets in the neighborhood are violent. For example, in connection with a word pair of $adjective_1 \cdot noun_1$ in an internal work, it may be determined not only that $adjective_1$ applies to $noun_1$, but also that words that are related to or associated with $adjective_1$ (e.g., synonyms of $adjective_1$) apply directly to $noun_1$, and that words that are related to or associated with $noun_1$ apply directly to $adjective_1$.

Relationships or associations between words within an internal work may be determined by any means and on any basis, according to the systems and methods of the present disclosure. For example, associations between words may be determined manually, i.e., designated by the author of the internal work or an authorized user, such as where the internal work is a scientific journal or other type of work that is known to contain several unique or uncommon words.

Additionally, associations between words may be determined automatically, for example, through the use of one or more machine learning tools that may be known to those of ordinary skill in the art. For example, in "Computation of Word Associations Based on the Co-Occurrences of Words in Large Corpora," by Manfred Wettler et al., and published in *Proceedings of the 1st Workshop on Very Large Corpora Academic and Industrial Perspectives* (1993), Wettler et al. developed a statistical model for predicting the strengths of word associations based on the relative frequencies of the common occurrences of words within large bodies of text, according to the law of association by contiguity. Wettler et al. analyzed separate corpora comprising approximately 33 million English words and approximately 21 million German words, respectively, to determine associative responses to 100 selected stimulus words.

Similarly, in "Hypothesizing Word Associations from Untagged Text," by Tomoyoshi Matsukawa and published following the 1993 Advanced Research Projects Agency (ARPA) Human Language Technology Workshop, Matsukawa disclosed a method for suggesting word associations based on algorithms that employ chi-square tests on joint frequencies of word pair groups compared against chance co-occurrences. Matsukawa's method included three main steps, including automatically tagging parts of speech within text; suggesting word pairs to be considered candidates for word associations through finite state pattern matching and forming a word co-occurrence matrix; and filtering or generalizing word associations via chi-square testing. For example, considering an initial pair (or submatrix) of word groups within the word co-occurrence matrix, words may be incrementally added into the submatrix until the submatrix achieves the highest possible chi-square. Finally, the chi-square score of the submatrix may be further increased by removing select words from the submatrix until an appropriate significance level is obtained. The Matsukama method was able to achieve fully automatic hypotheses of word associations starting from untagged text and generalizing to unobserved word associations, and was further able to automatically generate word groups and word associations using even low frequency words and word pairs, to an accuracy of approximately eighty-seven percent (87%).

Any other method for determining word associations may be utilized in accordance with the systems and methods of the present disclosure.

Similarly, the identification of contradictions between two or more established facts in an internal work may also be accomplished by any known means and on any basis, according to the systems and methods of the present disclosure. Where a first phrase includes a first word and a first modifier (such as a clause, another phrase or another word), and a second phrase includes a second word and a second modifier, the first phrase and second phrases may be deemed to establish a first fact and a second fact, respectively, and a contradiction may exist between the first fact and the second fact if the first word and the second word are related to or associated with one another, but the first modifier and the second modifier are not related to or associated with one another.

For example, the systems and methods of the present disclosure may identify multiple uses of the same nouns or verbs, or words that are related to or associated with the nouns or verbs, in different portions of an internal work, and may compare any relevant parts of speech, such as adjectives or adverbs, or other nouns or verbs, included in connection with the uses of the nouns or verbs, or words that are related to or associated with the nouns or verbs. Therefore, where an internal work refers to a word pair of adjective$_1$•noun$_1$ in one portion of the internal work, and to adjective$_2$•noun$_1$ in another portion of the internal work, a contradiction between the references may be identified if adjective$_1$ and adjective$_2$ are antonyms.

Additionally, where an internal work refers to a first word pair of adjective$_1$•noun$_1$ in one portion of the internal work, and to a second word pair of adjective$_2$•noun$_2$ in another portion of the internal work, a contradiction between the references may be identified if noun$_1$ and noun$_2$ are related to or associated with one another, and if adjective$_1$ and adjective$_2$ are neither related to nor associated with one another. For example, adjective$_1$ and adjective$_2$ are not antonyms, or if noun$_1$ and noun$_2$ are not synonyms, then a contradiction does not likely exist. Similarly, where an internal work refers to a first word pair of adjective$_1$•noun$_1$ in one portion of the internal work, and to a second word pair of adjective$_1$•noun$_2$ in another portion of the internal work, a contradiction between the references may be identified if adjective$_1$ and adjective$_2$ are related to or associated with one another, and if noun$_1$ and noun$_2$ are neither related to nor associated with one another.

Accordingly, where an internal work establishes facts regarding a "big dog" or a "red sports car" in one portion of the internal work, and establishes facts regarding a "small dog" or a "black Ferrari" in another portion of the internal work, the systems and methods of the present disclosure may identify the disparate references to a size of the dog and a color of the sports car, viz., the Ferrari, as inconsistencies or contradictions between the established facts of the internal work. Additionally, where a fictional piece establishes facts regarding a first number of things in one portion of the piece, i.e., by referring to "three zombies," and establishes facts regarding a second number of the same things in a second portion of the piece, i.e., "four zombies," the systems and methods of the present disclosure may identify the difference in the number of things as an inconsistency or contradiction between the established facts of the internal work.

One or more external references or sources may be consulted to determine whether a contradiction exists between established facts within an internal work. A dictionary may be used to determine the meanings of words used by an author to establish a fact, and a thesaurus may also be used to identify synonyms and/or antonyms of such words. An encyclopedia may be used to determine which, if any, of a series of contradictory established facts is correct. For example, where different portions of an internal work refer to Idaho as both the 43rd state and the 44th state to join the United States, a contradiction between the two established facts within the internal work is apparent. Therefore, an electronic or online encyclopedia may be consulted to determine that Idaho became the 43rd state to ratify the Constitution in July 1890, just one week prior to Wyoming's ratification, and the systems and methods of the present disclosure may recommend correcting the internal work to consistently refer to Idaho as the 43rd state.

The systems and methods of the present disclosure may identify discrepancies or inconsistencies using one or more mathematical or logical algorithms or formulas. For example, where the systems and methods of the present disclosure identify a discrepancy between two established facts within a internal work, a confidence level of the discrepancy may be determined using one or more formulas that may be weighted according to one or more factors, such as the proximity of the two established facts to one another (i.e., discrepant facts that are near to one another in an internal work may be considered differently from discrepant facts that are far apart within the internal work), the locations of the two established facts within the internal work (i.e., discrepant facts that are established early in an internal work or near the climax of the internal work may be considered differently from discrepant facts that are established near the conclusion), and the context of the two established facts within the internal work (i.e., discrepant facts that are critical to a plot, theme or story arc of an internal work may be considered differently from discrepant facts that are inconsequential to the plot, theme or story arc of the internal work). Where the confidence level exceeds a predetermined threshold, the author may be informed of the contradiction and/or a correction may be recommended. Where the confidence level does not exceed the predetermined threshold, the contradiction may be ignored. The systems and methods of the present invention may utilize one or more known computing tools or languages, such as machine learning tools or applications, in order to identify and enhance the identification of contradictions between established facts of internal works.

Moreover, the systems and methods of the present disclosure may be utilized to identify inconsistencies or contradictions between established facts in any type of internal work, including news articles, speeches, scripts, books, magazines or any other type of document. Furthermore, the systems and methods of the present disclosure may identify contradictions between internal facts across multiple internal works, i.e., across multiple documents in a series. For example, where checking the consistency of established facts in a script to a movie sequel is desired, the systems and methods of the present invention may analyze a script of the original movie to identify a first set of established facts before analyzing the script of the movie sequel to identify a second set of established facts, and may identify any contradictions in the second set of facts with respect to the first set of facts.

According to one embodiment of the present disclosure, a science fiction writer submits a first draft of a novel to a publishing company. The novel is a work of historical fiction about an interstellar plot to destroy the planet Earth, in which aliens stationed on the Plutonian moon Charon intercept the Voyager I and Voyager II space probes that were launched by the National Aeronautics and Space Administration (NASA) in 1977, infect the probes with an incurable virus, shroud the probes in radar-absorbing material, and centrifugally boomerang the probes back to Earth using the gravitational pull of the Neptunian moon Triton. Using one or more systems and methods of the present disclosure, the publishing company may check the established facts for consistency within the fictional portions of the novel, such as during the rising action, climax, falling action and conclusion of the novel, while exempting the historical facts concerning the launches of Voyager I and Voyager II and the flight paths traveled by the probes through the solar system that may be described in the introduction of the novel, from its analysis. Accordingly, prior to sending the novel to print, the publishing company is able to ensure that the science fiction writer has accurately and consistently established facts throughout the novel.

According to another embodiment of the present disclosure, an author prepares a biography of former President Franklin D. Roosevelt, who played football in high school and enjoyed swimming, sailing and fishing before contracting polio in 1921. The biography may thus be analyzed for consistency of internal facts concerning President Roosevelt's physical abilities and stature in two periods according to different standards: first, the period between his birth in 1882 and his paralysis in 1921 may be analyzed subject to a first standard, and, second, the period between his paralysis in 1921 and his death in 1945 subject to a second standard. Therefore, the systems and methods of the present disclosure may ensure that President Roosevelt is described in the biography as a healthy and athletic person prior to 1921, and a substantially paralyzed, wheelchair-bound person after 1921. If the biography establishes any facts that are inconsistent with President Roosevelt's physical condition either before or after 1921, i.e., established facts on the same side of an inflection point with respect to his health, such discrepancies may be identified by the systems and methods of the present disclosure as contradictions in established facts. However, the systems and methods of the present disclosure will not identify differences in established facts on either side of the inflection point with respect to his health, i.e., differences between established facts before 1921 versus after 1921, as contradictions in established facts.

According to yet another embodiment of the present disclosure, a writer pens an opinion-editorial ("op-ed") for a newspaper regarding the impact of the income tax cuts implemented under the Jobs and Growth Tax Relief Reconciliation Act of 2003 (JGTRRA), using a word processing application that operates in accordance with one or more systems or methods of the present disclosure. The subject of the op-ed is the impact of the income tax cuts implemented under the JGTRRA on federal income tax revenue. The guest writer states, at the outset, that the enactment of the JGTRRA led to a reduction in overall income tax revenues. Elsewhere in the op-ed, the guest writer cites to income tax revenue figures in subsequent years, which indicate that overall income tax revenues totaled $747.9 billion in 2003 and $1.116 trillion in 2007. Sensing the inherent contradiction between the stated premise of the op-ed (i.e., income tax revenues decreased under the JGTRRA), and the facts established by the guest writer later in the op-ed, (i.e., income tax revenues increased under the JGTRRA), the word processing application alerts the guest writer that a discrepancy has been found within his internal work, and not only requests a clarification but also offers assistance in correcting the discrepancy. Some other embodiments of the present disclosure may further obtain facts that are external to the op-ed, such as by identifying a relevant, external index (e.g., inflation) at or through an external resource, i.e., an online encyclopedia or other source, and advising the guest writer as to the extent of the actual change in revenues (viz., income tax revenues increased by 49.2% from 2003 to 2007) with respect to the relevant, external index (i.e., the rate of inflation was 12.5% from 2003 to 2007).

The present disclosure is directed to methods and systems for checking the consistency of established facts within one or more internal works, such as a document or a series of documents. Referring to FIG. 1, the various components of an embodiment of an interactive system 100 including one or more features that may be utilized to implement one or more aspects of the present disclosure is shown. The system 100 includes an author 10 having an associated printer 20, a marketplace 30, a publisher 40 and an external resource 50 that may be connected or otherwise associated with a network 60, such as the Internet.

The author 10 can be any entity or individual that wishes to create one or more original written works of any kind using a client application, such as a word processor 13, a web browser 14 or electronic mail ("E-mail") application 15 operating on a computer 12, which is connected to or otherwise communicates with the network 60 as indicated by line 16 through the sending and receiving of digital data. The word processor 13 may include any kind of standard software application that enables a user to generate written works of any kind (e.g., Microsoft Word or Corel WordPerfect). The web browser 14 may include any kind of network communications portal that enables a user to access a network 60, such as the Internet, by entering or submitting text of any kind (e.g., Microsoft Internet Explorer, Mozilla Firefox, Google Chrome). The E-mail application 15 may be any kind of standard application that enables a user to send or receive electronic messages, such as an embedded application or personal information management system operating on a computer (e.g., Microsoft Outlook or Microsoft Entourage).

Those of skill in the pertinent art will recognize that the author 10 may use a keyboard, keypad, mouse, stylus, touch screen, or other device (not shown) or method for interacting with the computer 12 and/or the word processor 13, the web browser 14 or the E-mail application 15, or to "select" an item, link, node, hub or any other aspect of the present disclosure. Additionally, the author 10 may, optionally, be associated or affiliated with a printer 20, which may be connected to or otherwise communicate with the computer 12 over the network 60, as indicated by line 26, through the sending and receiving of digital data.

The marketplace 30 may be an electronic commerce ("E-commerce") or Internet-based marketplace (or supplier, retailer, seller, reseller or distributor) of items, including one or more written works created by authors, such as the author 10. The marketplace 30 itself may be an entity that sells or otherwise makes items available for download, purchase, rent, lease or borrowing by customers from a marketplace web site 34 or other processing system which may be implemented or maintained using one or more physical computer servers 32. The marketplace server 32 is connected to or otherwise communicates through a network 60, such as the Internet, as indicated by line 36, by sending and receiving of digital data.

The publisher 40 may be any entity or individual that prepares, prints or issues published works created by authors, such as the author 10. The publisher 40 may prepare, print or issue books, journals, periodicals or any other type of written document for sale or other distribution. The published works may be made available using a computer 42 operating communications software 44, and may be distributed through one or more vendors, merchants or marketplaces, such as marketplace 30, either electronically or in print form (e.g., hardcover or soft cover). The publisher computer 42 is connected to or otherwise communicates through a network 60, such as the Internet, as indicated by line 46, by sending and receiving of digital data.

The external resource 50 may be any entity or individual that has access to or otherwise makes available information of any kind for use in identifying established facts in an internal work, or in identifying contradictions between two or more established facts within the internal work, and in making recommendations to address any contradictions that may be identified. The external resource 50 may be, for example, a calculator, a calendar, a dictionary, an encyclopedia, a thesaurus, or any other resource that may be accessed by the author 10, the marketplace 30 or the publisher 40 over a network 60, such as the Internet. The external resource server 52 is connected to or otherwise communicates through the network 60, such as the Internet, as indicated by line 56, by sending and receiving of digital data.

The computers, servers, and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein. Also, those of skill in the pertinent art will recognize that the author 10 may use a keyboard, keypad, mouse, stylus, touch screen, or other device (not shown) or method for interacting with the computer 12 and/or the word processor 13, the web browser 14 or the E-mail software 15, or to "select" an item, link, node, hub or any other aspect of the present disclosure. Similarly, the publisher 40 may use a keyboard, keypad, mouse, stylus, touch screen, or other device (not shown) or method for interacting with the computer 42 and/or communication software 44 or to "select" an item, link, node, hub or any other aspect of the present disclosure.

Process steps described herein as being performed by an "author," a "marketplace," a "publisher" or an "external resource" may be automated steps performed by their respective computer systems, or implemented within software modules (or computer programs) executed by one or more general purpose computers. For example, the word processor 13, the web browser 14 or the E-mail software 15 may be implemented on the computer 12 using one or more software applications. Specially designed hardware could, alternatively, be used to perform certain operations. Moreover, process steps described as being performed by an "author," a "marketplace," a "publisher" or an "external resource" may be typically performed by a human operator via the computer 12, the server 32, the computer 42 or the server 52 but could, alternatively, be performed by an automated agent.

The author 10, the marketplace 30, the publisher 40 and the external resource 50 may use any web-enabled or Internet applications or features, such as the word processor 13, the web browser 14, the E-mail software 15, the web site 34, the communications software 44 or the web site 54, or any other client-server applications or features including electronic mail (or E-mail), or other messaging techniques, to connect to the Internet 60 or to communicate with one another, such as short or multimedia messaging service (SMS or MMS) text messages. In addition, the computers 12, 42 and the servers 32, 52 may include any of a number of computing devices that are capable of communicating over the network, including but not limited to set-top boxes, personal digital assistants, mobile phones including "smart" phones, digital media players, web pads, tablet computers, laptop computers, desktop computers, electronic book readers, and the like. The protocols and components for providing communication between the computers 12, 42 and/or the word processor 13, web browser 14, E-mail software 15 or communications software 44, and the servers 32, 52 and/or web sites 34, 54 are well known to those skilled in the art of computer communications and thus, need not be described in more detail herein.

The data and/or computer executable instructions, programs, firmware, software and the like (also referred to herein as "computer executable" components) described herein may be stored on a computer-readable medium that is within or accessible by the computers 12, 42 and/or the servers 32, 52, and having sequences of instructions which, when executed by a processor (such as a central processing unit, or CPU), cause the processor to perform all or a portion of the functions and/or methods described herein. Such computer executable instructions, programs, software and the like may be loaded into the memory of the computers 12, 42 and/or the servers 32, 52 using a drive mechanism associated with the computer readable medium, such as a floppy drive, CD-ROM drive, DVD-ROM drive, network interface, or the like, or via external connections.

Figure 2:
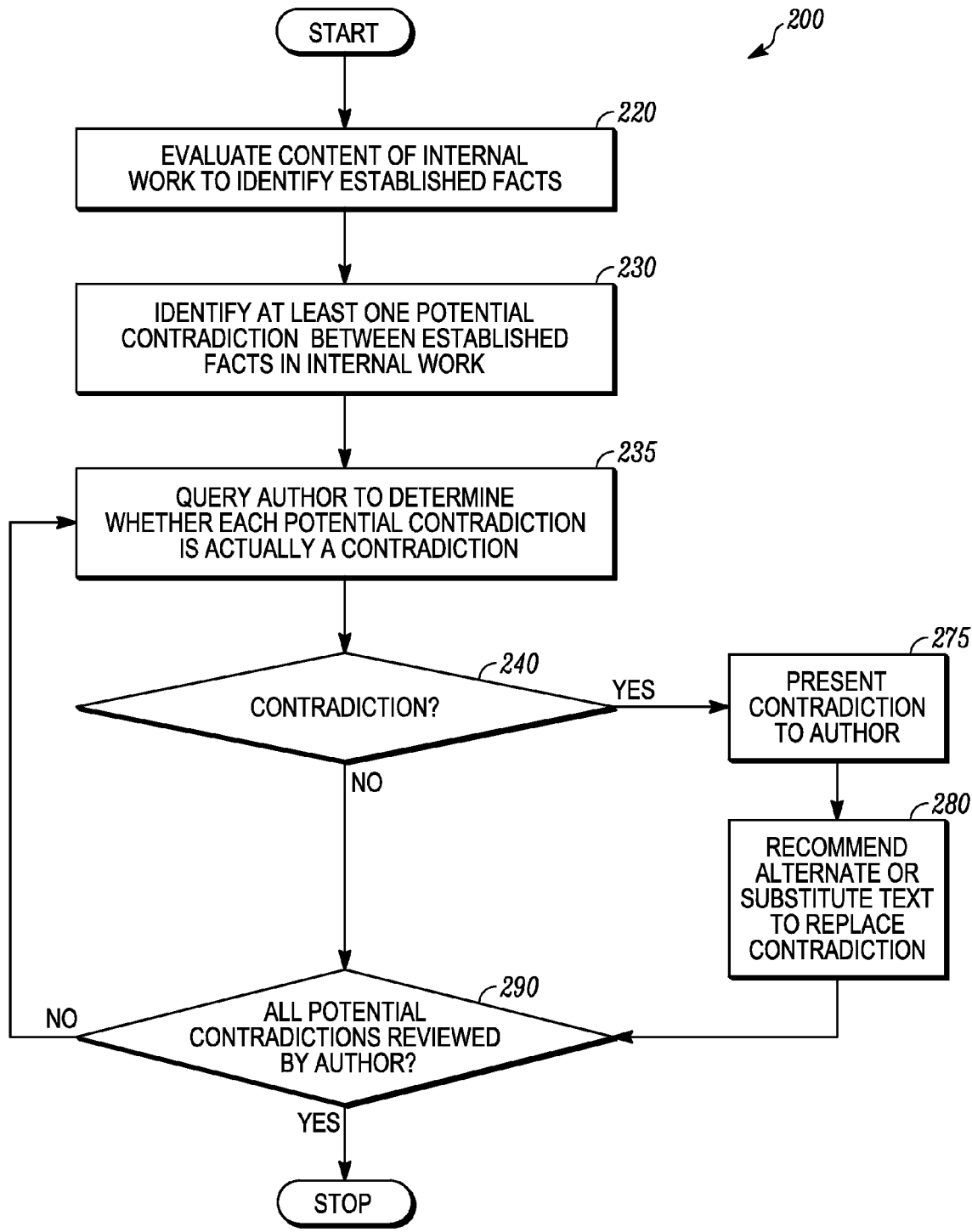
FIG. 2 is a flow chart of a method for checking the consistency of established facts within internal works, in accordance with embodiments of the present disclosure.

Referring to FIG. 2, a flow chart 200 representing one embodiment of a method for checking the consistency of established facts within an internal work according to the present disclosure is shown. At step 220, a system evaluates the content of an internal work to identify established facts. For example, the system may search the text portion of any document, such as a story, a novel, a script, a news article or any other document, to identify pairs of nouns and adjectives or to otherwise detect established facts that may be present within the document. At step 230, the system identifies at least one potential contradiction between established facts within the internal work. For example, where a story refers to a day as "sunny" in one portion of the story and refers to the day as "cloudy" in another portion of the story, the systems and methods of the present disclosure may identify the author's differing characterizations of the weather on that particular day as a potential contradiction.

At step 235, the system may query the author to determine whether each of the potential contradictions is, in fact, a contradiction between established facts. In the foregoing example where an author refers to a day as both "sunny" and "cloudy" in a story, the system may inform the author of the internal work of the potential contradiction and inquire as to whether the disparate references were intended, i.e., whether a change in a weather pattern is occurring within the plot of the story. At step 240, if the potential contradiction is not a contradiction after all, then the system advances to step 290. At step 240, if the potential contradiction is, in fact, a contradiction, then the process advances to step 275, where the contradiction is presented to the author. At step 280, a set of alternate or substitute text may be recommended to replace the contradiction, and the system advances to step 290. For example, the systems and methods of the present disclosure may recommend changing either the "sunny" reference to "cloudy," or the "cloudy" reference to "sunny," depending on any other related words and/or the context of the story, or for any other reason.

At step 290, the system determines whether each of the potential contradictions identified in the internal work has been reviewed by the author. If the author has not reviewed each of the potential contradictions, then the system returns to step 235. If the author has reviewed each of the potential contradictions, then the process ends.

Therefore, according to the process represented by the flow chart 200 shown in FIG. 2, the systems and methods of the present disclosure may analyze an internal work to identify established facts, and to identify any contradictions between established facts, within an internal work. If any contradictions are identified, then the systems and methods of the present disclosure may recommend modifications to the internal work in an effort to address such contradictions. Moreover, an analysis of an internal work may be performed simultaneously as the internal work is being prepared, after the internal work has been completed, or at any other time.

Established facts may be identified within an internal work by any means and on any basis. Referring to FIG. 3, an internal work 310 and a set of established facts 350 identified within the internal work 310 is shown. In the first paragraph of the internal work 310, statements 312, 314, 316, 318 are identified as containing established facts 352, 354, 356, 358 regarding the height of an individual, Steven. Specifically, the first paragraph of the internal work contains express statements 312, 314 regarding Steven's height, which indicate that Steven has always been tall ("tall child," "tallest student in his class"), while statements 316, 318 contain information from which Steven's height may be deduced. For example, the first paragraph of the internal work 310 includes statement 316 indicating that he played varsity basketball, a sport commonly played by tall people, and statement 318 indicating that he played the specific position of center, a position commonly played by one of the tallest players on a basketball team. From these statements 312, 314, 316, 318, the established facts 352, 354, 356, 358, i.e., that Steven is tall, may be identified.

Similarly, the second paragraph of the internal work 310 also includes statements 320, 322 which indicate that Steven is tall. Statement 320 states that Steven met his fiancée while shopping at a Big & Tall Man's store, from which established fact 360 may be identified. Statement 322 indicates that Steven wears size 13 shoes, which is a particularly large size. Because of the strong correlation between foot size and height, established fact 362 may be identified based on the expressed size of Steven's shoe.

The third paragraph of the internal work 310, however, includes statement 330 indicating that Steven is short. The third paragraph states that Steven's favorite article of clothing was a small T-shirt that he purchased at age 20, an age at which most humans are fully grown. Therefore, established fact 370, i.e., that Steven is short, is identified.

Accordingly, as is shown in the internal work 310 of FIG. 3, an internal work may be analyzed to identify one or more established facts therein on any basis. For example, an established fact may be identified based on express statements in the internal work, such as statements 312, 314, 320 shown in the internal work 310 of FIG. 3, or deduced from other, implicit statements in the internal work, such as statements 316, 318, 322, 330.

Figure 4A:
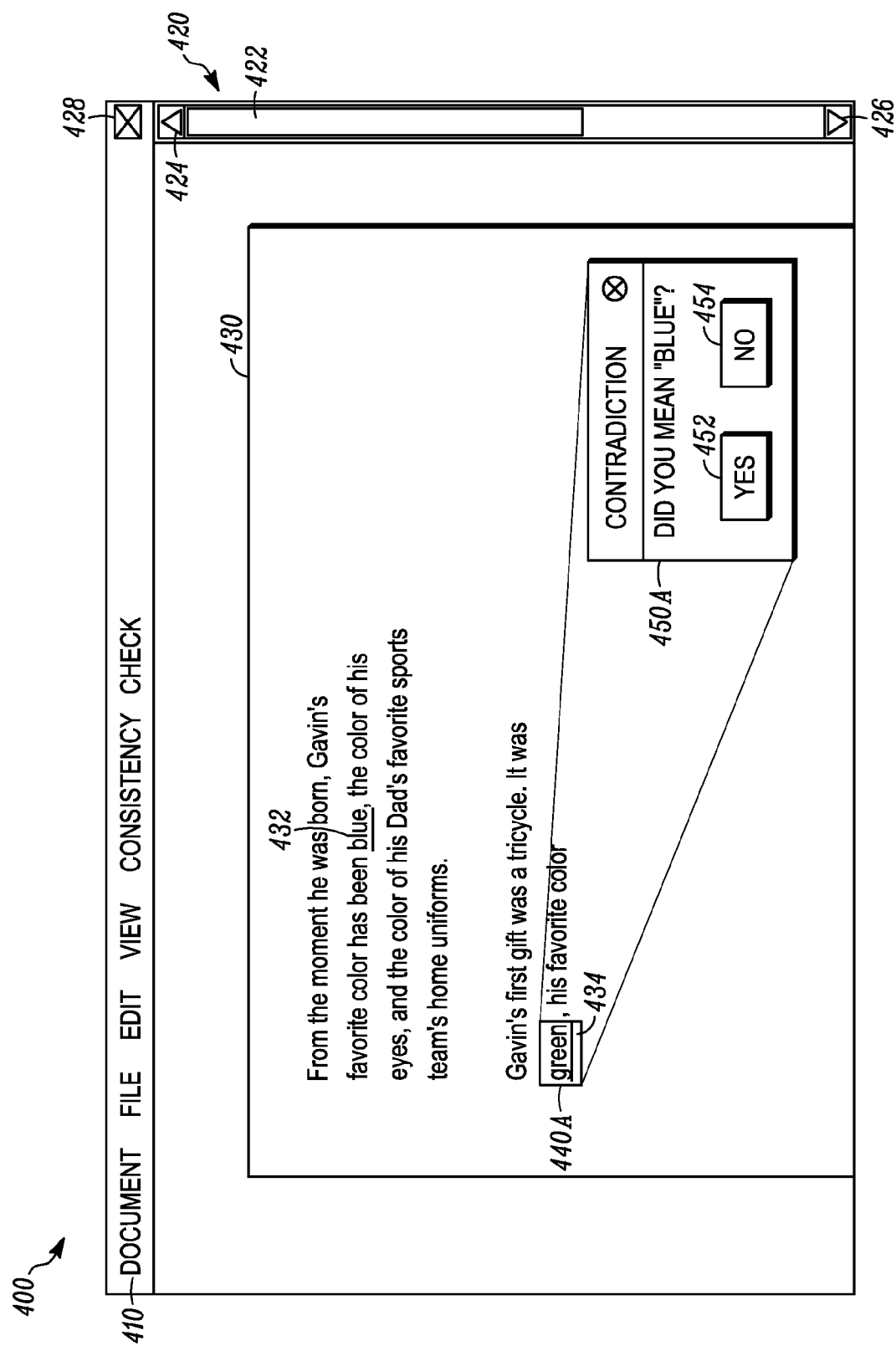
FIGS. 4A and 4B are user interfaces utilized by or in accordance with methods and systems for checking the consistency of established facts within internal works, in accordance with embodiments of the present disclosure.

As is set forth above, the systems and methods of the present disclosure may evaluate internal works to identify contradictions in established facts spontaneously, such as by operating in the background as an internal work is being created. Referring to FIG. 4A, a user interface 400 is shown. The user interface 400 is displayed in connection with a word processing application, and includes a menu bar 410, a scroll bar 420 including slider 422, and scroll arrows 424, 426, as well as a close box 428.

The user interface 400 of FIG. 4A also displays a document 430 including a body of text which is being typed, by a user. The first paragraph of the body of text includes a statement from which established fact 432, i.e., that a child's favorite color is blue, may be identified. The second paragraph of the body of text includes a statement from which established fact 434, i.e., that the child's favorite color is green, may be identified.

Once a sufficient portion of the second paragraph of the body of text has been entered such that the established fact 434 may be identified, a potential contradiction 440A is highlighted and a dialog box 450A is automatically displayed on the user interface 400. The potential contradiction 440A is detected based on a conflict between established fact 434 and established fact 432, regarding the child's favorite color, and the dialog box 450A suggests a change to the body of text that may remedy the potential contradiction 440A. As is shown in FIG. 4A, a user may select button 452 to change the text from which established fact 434 was identified, and may select button 454 to ignore the potential contradiction 440A.

Figure 4B:
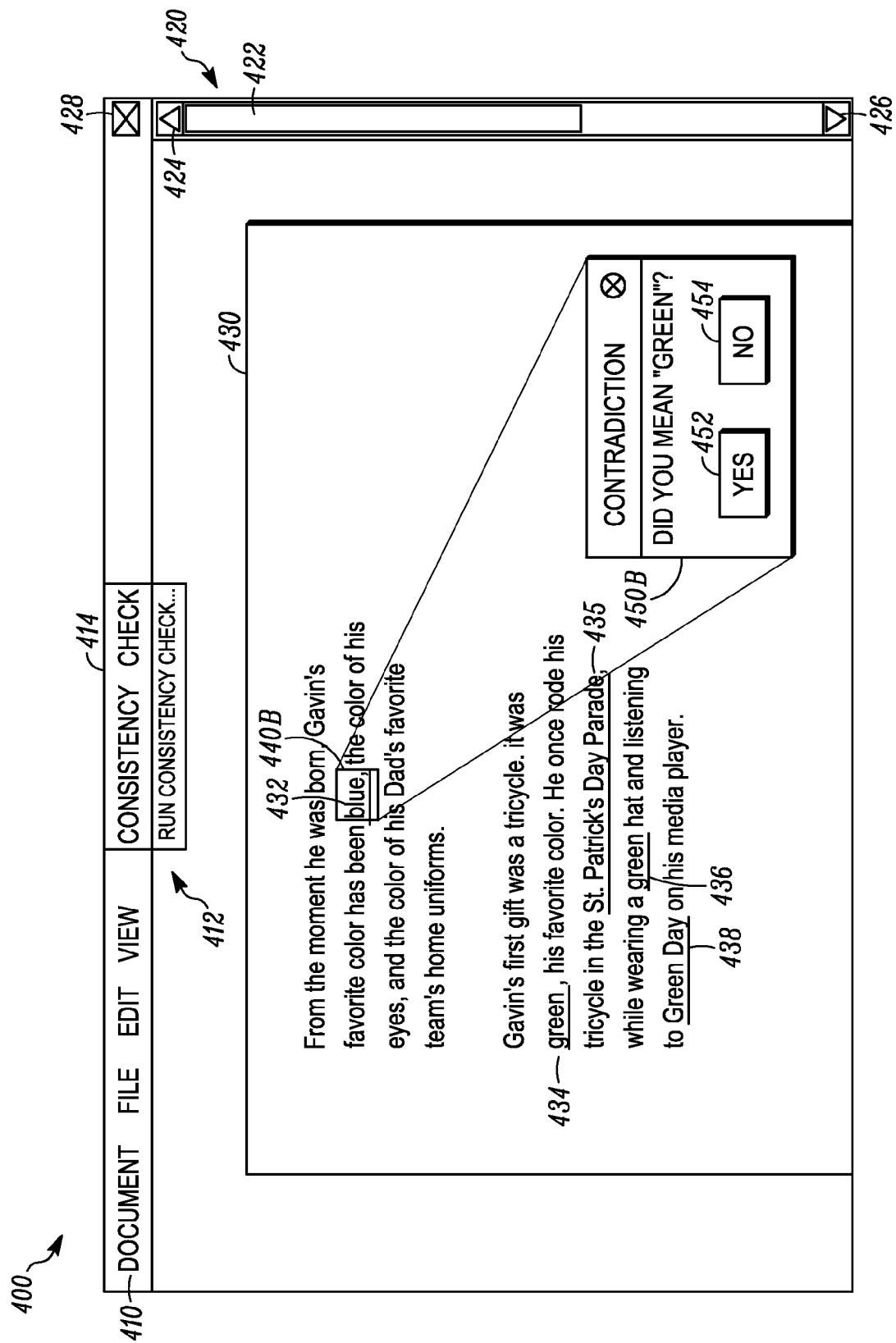

As is also set forth above, the systems and methods of the present disclosure may evaluate some or all of an internal work to identify contradictions in established facts upon the direction of a user. Referring to FIG. 4B, the user interface 400 of FIG. 4A is shown, after additional text has been added to the document 430. The additional text includes statements from which established facts 435, 436, 438 may be identified. Each of the established facts 435, 436, 438 is consistent with the established fact 434, i.e., that the child's favorite color is green, and inconsistent with the established fact 432, i.e., that the child's favorite color is blue.

As is shown in FIG. 4B, a user may initiate an analysis of the document 430 manually, such as by selecting option 414 in the menu bar 410, and then selecting option 412 from a pull-down menu associated with the option 414. As a result of the analysis of the document 430, a potential contradiction 440B is highlighted and a dialog box 450B is automatically displayed on the user interface 400. The potential contradiction 440B is detected based on a conflict between established fact 432 and established fact 434, 435, 436, 438, and the dialog box 450B suggests a change to the body of text that may remedy the potential contradiction 440B. Unlike the user interface 400 shown in FIG. 4A, in which a suggested change was recommended for the statement from which established fact 434, i.e., that the child's favorite color is green, was identified, a suggested change was recommended for the statement from which established fact 432, i.e., that the child's favorite color is blue, was identified on the user interface 400 in FIG. 4B.

Where a set of established facts is identified in an internal work, potential contradictions between two or more of the established facts set forth in the internal work are, indeed, contradictory. For example, a confidence level may be determined from such a formula or algorithm in connection with a difference between two or more established facts. If the confidence level exceeds a threshold, then the author or other user of a system or method of the present disclosure may be identified. If the confidence level does not exceed the threshold, then the difference between the established facts may be ignored.

For example, where an internal work includes references to a "blue shirt" and an "azure shirt," a potential contradiction between established facts regarding the "shirt" exists, based on the literal difference between the words used to describe the shirt. However, because azure is a shade of blue, and because the word "azure" is sometimes used as a synonym of the word "blue," a confidence level that the difference in terms is a contradiction in established facts calculated according to such a formula would be quite low. If the internal work included references to a "red shirt" and an "azure shirt," a confidence level calculated according to such a formula would be quite high, because azure is not a shade of red, and because "azure" is not a synonym of "red."

A formula or algorithm for calculating a confidence level with respect to differences between two or more established facts may be based on any factor. For example, a formula or algorithm may apply weights or other emphases to elements of the established facts based on their proximity to one another within the internal work, the facts' respective locations within the internal work, or the facts' context within the internal work (i.e., whether the facts are essential to the plot, theme or arc of the internal work). One weighted formula for calculating a confidence level is shown in Equation (1), below:

$$\text{confidence} = (n_{proximity} \cdot x_{proximity}) + (n_{location} \cdot x_{location}) + (n_{context} \cdot x_{context}) \quad (1)$$

where confidence is a calculated confidence level that a difference in established facts within the internal work is a contradiction; where $n_{proximity}$, $n_{location}$ and $n_{context}$ are numerical measures of the proximity, location and context of the established facts within the internal work; and where $x_{proximity}$, $x_{location}$ and $x_{context}$ are weighted factors assigned to the proximity, location and context, respectively, of the established facts within the internal work. For example, $n_{proximity}$ may represent a difference in lines or pages between the established facts within the internal work; $n_{location}$ may represent an average location of the two established facts within the internal work; and $n_{context}$ may represent an average ratio or expression of the relation between the established facts and the plot or theme of the internal work, with $n_{context}$ having a value of 0.0 where the established facts are irrelevant to the plot or theme of the internal work, and a value of 1.0 where the established facts are critical to the plot or theme of the internal work.

Likewise, $x_{proximity}$ may be a weighted measure of the significance that facts near to one another be consistent within an internal work; $x_{location}$ may be a weighted measure of the significance that facts in one portion of a document be consistent within an internal work; and $x_{context}$ may be a weighted measure of the significance that facts that are critical to the context of an internal work be consistent within an internal work.

Any other formula or algorithm for calculating a confidence level regarding a difference in established facts may be utilized in accordance with the systems and methods of the present disclosure.

Figure 5:
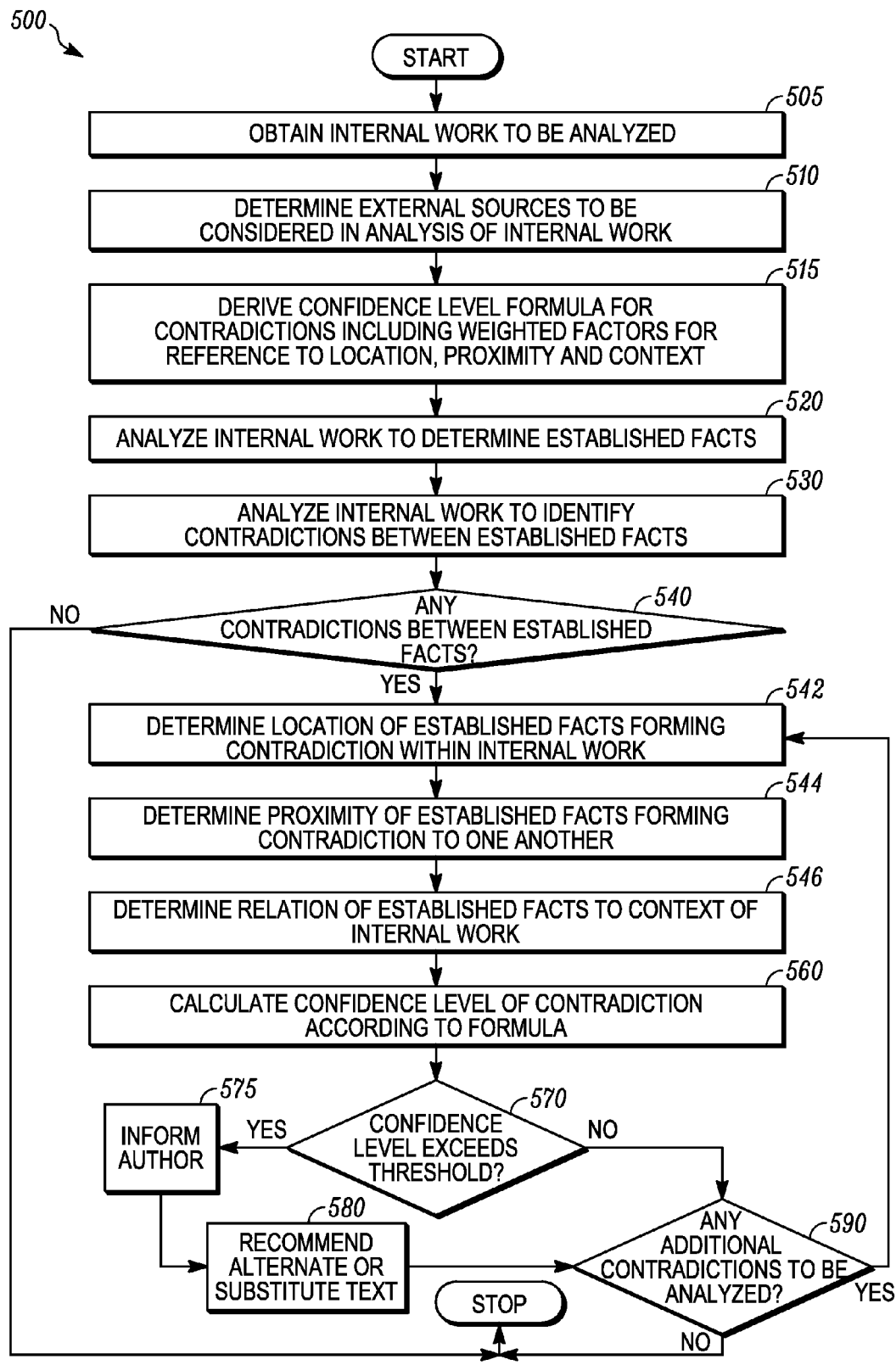
FIG. 5 is a flow chart of a method for checking the consistency of established facts within internal works, in accordance with embodiments of the present disclosure.

Referring to FIG. 5, a flow chart 500 representing one embodiment of a method for checking the consistency of established facts within an internal work to be performed by a computer system according to the present disclosure is shown. Except where otherwise noted, reference numerals preceded by the number "5" in FIG. 5 indicate steps that are similar to steps having reference numerals preceded by the number "2" shown in FIG. 2.

At step 505, the system obtains an internal work to be analyzed. For example, a publisher may receive a first draft of a manuscript from an author. At step 510, one or more external sources to be consulted during an analysis of the internal may be identified. For example, the publisher may designate a dictionary, a thesaurus, an encyclopedia or any other external reference to be utilized in connection with the analysis.

At step 515, the system derives a confidence level formula for determining whether an actual contradiction exists between established facts in the internal work. For example, a formula for determining whether a contradiction between established facts exists may be determined based on the location of the established facts within the internal work, the proximity between the established facts within the internal work, and the relation of the established facts to the context of the internal work, or the relation between the respective contexts of the established facts to one another. At step 520, the internal work may be analyzed to identify established facts within the internal work. Established facts may be identified by any means and on any basis, such as, for example, by determining associations and relationships between words used by the author of the internal work.

At step 530, the internal work may be analyzed to identify any contradictions between the established facts identified at step 530. If there are no contradictions between any of the established facts at step 540, then the process ends. If there are any contradictions between any of the established facts, then the process advances to step 542, where the locations of the established facts that form the contradictions are determined. Locations of established facts may be determined, for example, by identifying the chapter, page, paragraph, line or section in which each of the established facts is located within the internal work. At step 544, the proximity of the established facts that form the contradictions to one another is determined. For example, the locations of each of the established facts may be compared to one another. At step 546, the relation of the established facts to the context of the internal work is determined.

Once the locations, proximity and relationship of the established facts that form the contradiction are determined, then at step 560, a confidence level is calculated according to the formula derived at step 515. If the confidence level exceeds a threshold at step 570, then the process advances to step 575, where system informs the author of the contradiction, and to step 580, where the system recommends alternate or substitute text to address the contradiction. If the confidence level does not exceed the threshold at step 570, then the process advances to step 590, where the system determines if any additional contradictions must be analyzed. If there are any remaining contradictions, then the process returns to step 542. If there are no remaining contradictions, then the process ends.

Therefore, according to the systems and methods of the present disclosure, contradictions between established facts may be identified through the use of formulas or equations that calculate a confidence level and, if the confidence level exceeds a threshold, then a recommendation may be provided to address the contradictions.

Figure 6:
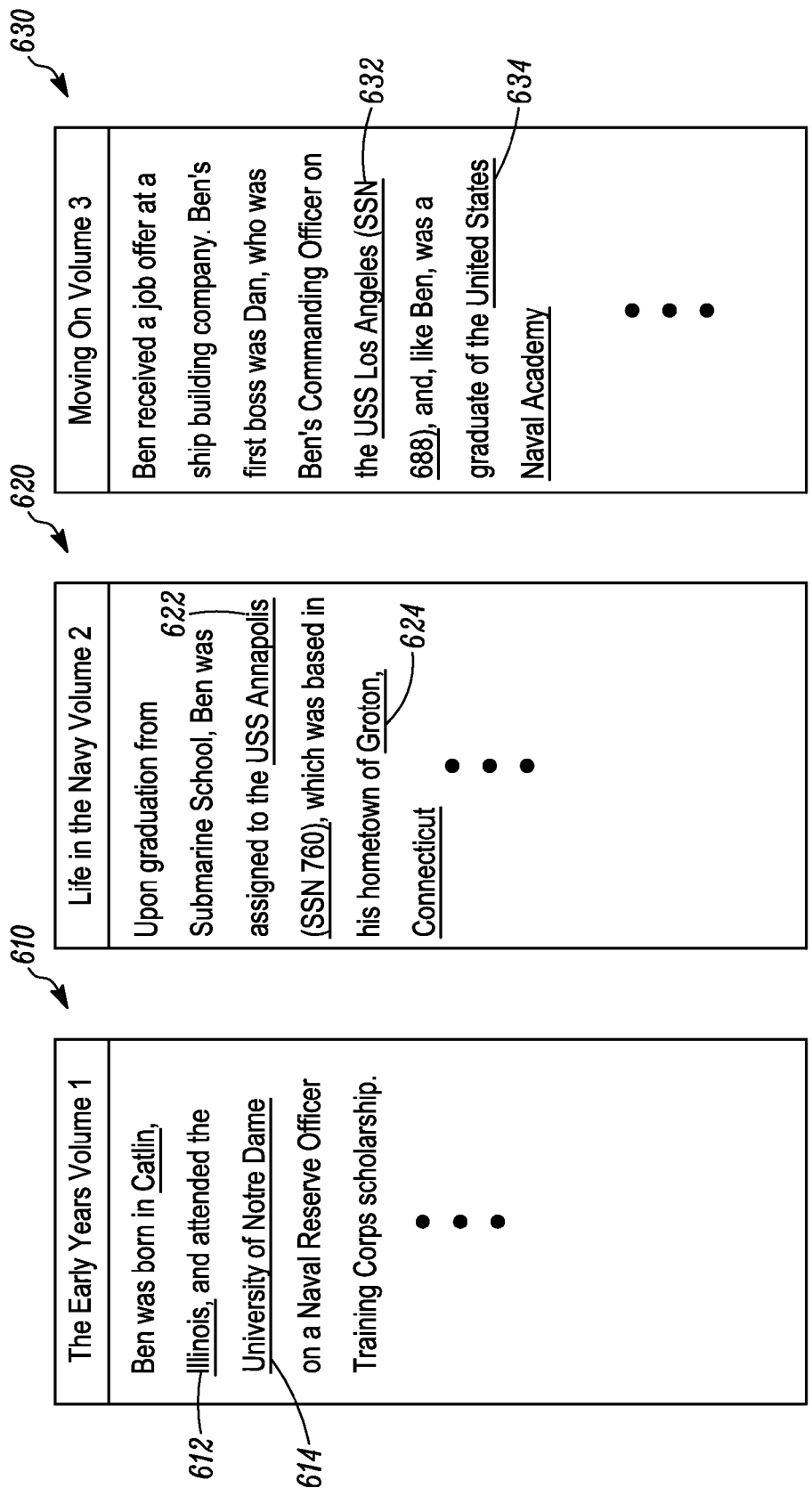
FIG. 6 includes user interfaces utilized by or in accordance with methods and systems for checking the consistency of established facts within internal works, in accordance with embodiments of the present disclosure.

The systems and methods of the present disclosure may be utilized to identify established facts within multiple documents, such as a series of books, and to identify contradictions between established facts across the multiple documents. Referring to FIG. 6, portions of three volumes 610, 620, 630 in a biography 600 of a naval officer are shown. Each of the volumes 610, 620, 630 includes a number of statements from which established facts may be identified. In volume 610, statements 612, 614 establish the birthplace of the naval officer who is the subject of the biography 600, and the college that he attended. In volume 620, statements 622, 624 identify the vessel on which the officer was stationed, and the homeport of the vessel. In volume 630, statements 632 also refer to the vessel on which the officer was stationed, and the college that he attended.

As is shown in FIG. 6, at least three contradictions between established facts throughout the biography 600 may be identified across the volumes 610, 620, 630. First, volumes 610 and 620 include conflicting statements 612, 624 that identify two different cities as the officer's hometown. Second, volumes 620 and 630 include conflicting statements 622, 632 regarding the vessel on which the officer was stationed. Third, volumes 610 and 630 include conflicting statements 614, 634 regarding the college that the officer attended. Each of these contradictions may be identified and addressed according to one or more systems and methods of the present disclosure, such as the methods represented in flow charts 200, 500 of FIGS. 2 and 5, respectively.

Accordingly, the systems and methods of the present disclosure may be utilized to evaluate not only the consistency of established facts within a single internal work, but also the consistency of established facts across multiple internal works, such as the volumes 610, 620, 630 of the biography 600 of FIG. 6. Such functionality is particularly valuable for evaluating later volumes of a series with respect to earlier volumes of the series; a script of a movie sequel with respect to the original movie; or a speech on a topic with respect to previous speeches on the topic by the same speaker.

As is set forth above, the systems and methods of the present disclosure may identify and contradictions between established facts within an internal work using formulas or algorithms that evaluate the degree of the contradiction between the established facts in order to determine whether the contradiction is so significant that it must be addressed, or whether the contradiction is immaterial and may be ignored based on one or more factors. Referring to FIG. 7, an internal work 710 in the form of a biography is shown, along with a set of established facts 750. The first paragraph of the internal work 710 shown in FIG. 7 recounts a childhood memory of the subject of the biography. Specifically, the first paragraph includes statements 722, 724, 725, 726, 727, 728 having a location 760 early in the biography (viz., page 2) regarding the subject's experiences in his backyard, which was lined with ash trees. From the statements 722, 724, 725, 726, 727, 728, the context 762 (i.e., a childhood memory) and several established facts 764, 765, 766, 767, 768 may be identified, including that ash trees are thick, strong and durable. The second paragraph of the internal work 710 shown in FIG. 7 includes statements 732, 734, 735, 736, 737, 738 having a location 770 later in the biography (viz., page 315) regarding an experience in the subject's life, i.e., when he took his son to a baseball game. From the statements 732, 734, 735, 736, 737, 738, the context 772 of the statements (i.e., a reference to a baseball game) and several established facts 774, 775, 776, 777, 778 may be identified, including the fact 776 that baseball bats are made of ash, and the fact 777 that ash is brittle.

Ostensibly, the established facts 764, 765, 766, 767, 768 that have been identified based on statements 724, 725, 726, 727, 728 of the first paragraph of the internal work 710 shown in FIG. 7 stand in direct conflict with the established facts 776, 777 that have been identified based on statements 736, 737 of the second paragraph of the internal work 710 shown in FIG. 7. However, because the context 762 of statements 724, 725, 726, 727, 728 differs greatly from the context 772 of statements 736, 737, and because the location 720 of statements 724, 725, 726, 727, 728 and the location 730 of statements 736, 737 are far apart from one another (i.e., over three hundred pages), a confidence level of the contradiction between the established facts 764, 765, 766, 767, 768 and the established facts 776, 777 would not likely be deemed to a require correct. The references to ash in the statements 722, 724, 725, 726, 727, 728 and in the statements 736, 737 are immaterial to either the context of the story or to one another.

Figure 8:
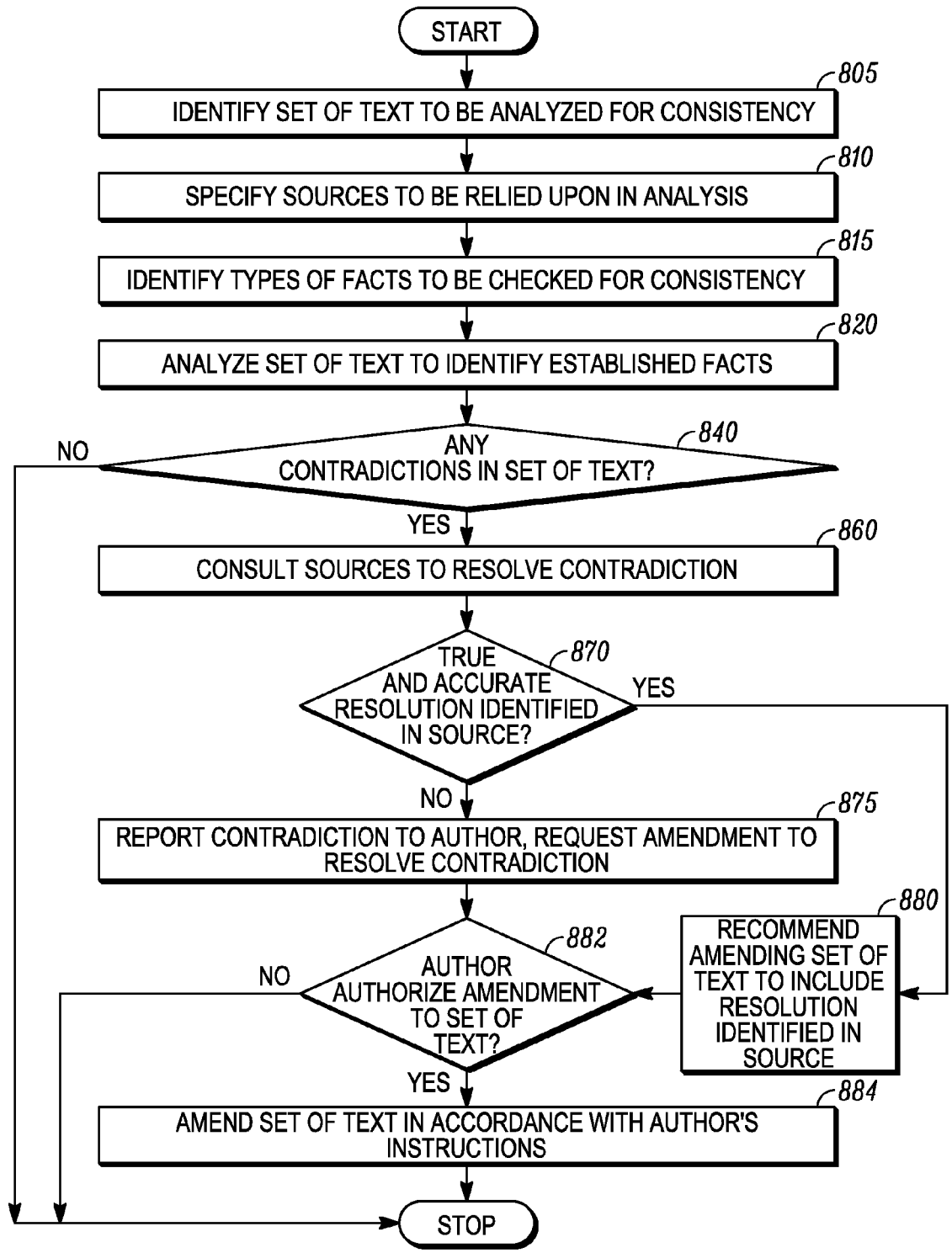
FIG. 8 is a flow chart of a method for checking the consistency of established facts within internal works, in accordance with embodiments of the present disclosure.

As is set forth above, one or more external resources may be utilized to not only identify but also resolve any contradictions that may be identified between two or more established facts in an internal work. Referring to FIG. 8, a flow chart 800 representing one embodiment of a method for checking the consistency of established facts within an internal work to be performed by a computer system according to the present disclosure is shown. Except where otherwise noted, reference numerals preceded by the number "8" in FIG. 8 indicate steps that are similar to steps having reference numerals preceded by the number "2" shown in FIG. 2, or the number "5" in FIG. 5.

At step 805, the system identifies a set of text to be analyzed for consistency, and at step 810, a user specifies one or more sources to be relied upon in an analysis of the set of text. For example, the user may select a dictionary, a thesaurus, an encyclopedia or any other external resource to be utilized in resolving any contradictions that may be identified.

At step 815, the user may identify certain types of established facts (e.g., dates, times, places or any other type of fact) that are to be checked within the set of text for consistency. At step 820, the set of text may be analyzed to identify established facts of the types identified at step 815.

At step 840, the system determines whether any contradiction exists between two or more of the established facts that were identified at step 820. If no contradiction exists, then the process ends. If any contradiction exists, then the process advances to step 860, where the system consults one or more of the sources specified at step 820 in order to identify a resolution to the contradiction. At step 870, if a true and accurate resolution to the contradiction has been identified in one or more of the sources, then the system advances to step 880, and recommends an amendment to the set of text to resolve the contradiction, and presents the amendment to the author for his or her authorization at step 882. If a true and accurate resolution is not identified, then the contradiction is reported to the author of the text at step 875, and the author is asked to provide an amendment to the set of text at step 882.

At step 882, if the author authorizes an amendment to the set of text, then the system amends the text in accordance with the author's instructions at step 884, and the process ends. If the author does not authorize an amendment to the text, then the process ends.

External sources to be relied upon in identifying external facts, in identifying contradictions between established facts, or in identifying a resolution to one or more contradictions within an internal work may be selected by any means according to the systems and methods of the present disclosure, such as in step 810 of the flow chart 800 of FIG. 8. Referring to FIG. 9A, a user interface including a dialog box 910 is shown. The dialog box 910 of FIG. 9A may be displayed to any user of the systems and methods of the present disclosure, in order to enable the user to select one or more external sources to be relied upon in identifying contradictions between established facts and recommending resolutions. As is shown in FIG. 9A, the dialog box 910 includes instructions 912 and check boxes 920, 922, 924, 926, 928 that may be selected or deselected by a user to designate or undesignated one or more external sources (e.g., a calculator, a calendar, a dictionary, an encyclopedia or a thesaurus) to be consulted in resolving contradictions between two or more established facts in an internal work.

Once one or more external sources have been selected by a user, the systems and methods of the present disclosure may evaluate the internal work with respect to information that may be accessed through one or more of the external sources (e.g., a calculator, a calendar, a dictionary, an encyclopedia or a thesaurus), and use that information to either identify a contradiction between established facts or recommend a change to the internal work that would address the contradiction. Referring to FIG. 9B, a user interface 940 is shown. The user interface 940 may be displayed by word processing software, electronic mail clients or any other application for preparing or reviewing an internal work, and includes a passage of text featuring statements 942, 944, 946. Based on facts identified in one or more of the external sources identified by the user, dialog box 950 is displayed on the user interface 940, and includes contradictions 960, 962, 964. For example, based on the statements 942, 944, 946 in the passage of text shown in FIG. 9B, the author appears to have established that the Dow Jones Industrial Average closed above 10,000 points for the first time in history on Mar. 27, 1999. The systems and methods of the present disclosure may identify one or more contradictions inherent in the passage of text, including that Mar. 27, 1999, was a Saturday; that Wall Street trading floors are typically closed on Saturdays; and that the Dow Jones Industrial Average actually closed above 10,000 points for the first time on Mar. 29, 1999, and not on Mar. 27, 1999. In view of the information presented in the dialog box 950, the user may elect to amend the passage of text to address the contradictions stated therein, or to ignore the contradictions.

As is set forth above, the systems and methods of the present disclosure may be utilized to evaluate portions of an internal work for consistency between established facts within the internal work, and to exclude other portions from such an evaluation. For example, where a writer pens a piece of historical fiction having a background based on actual events and a plot based on fictional events, the author may designate the portions of the piece that are based on actual events to be analyzed for consistency between established facts, while exempting or bypassing the portions of the piece that are based on fictional events from the analysis.

Figure 10:
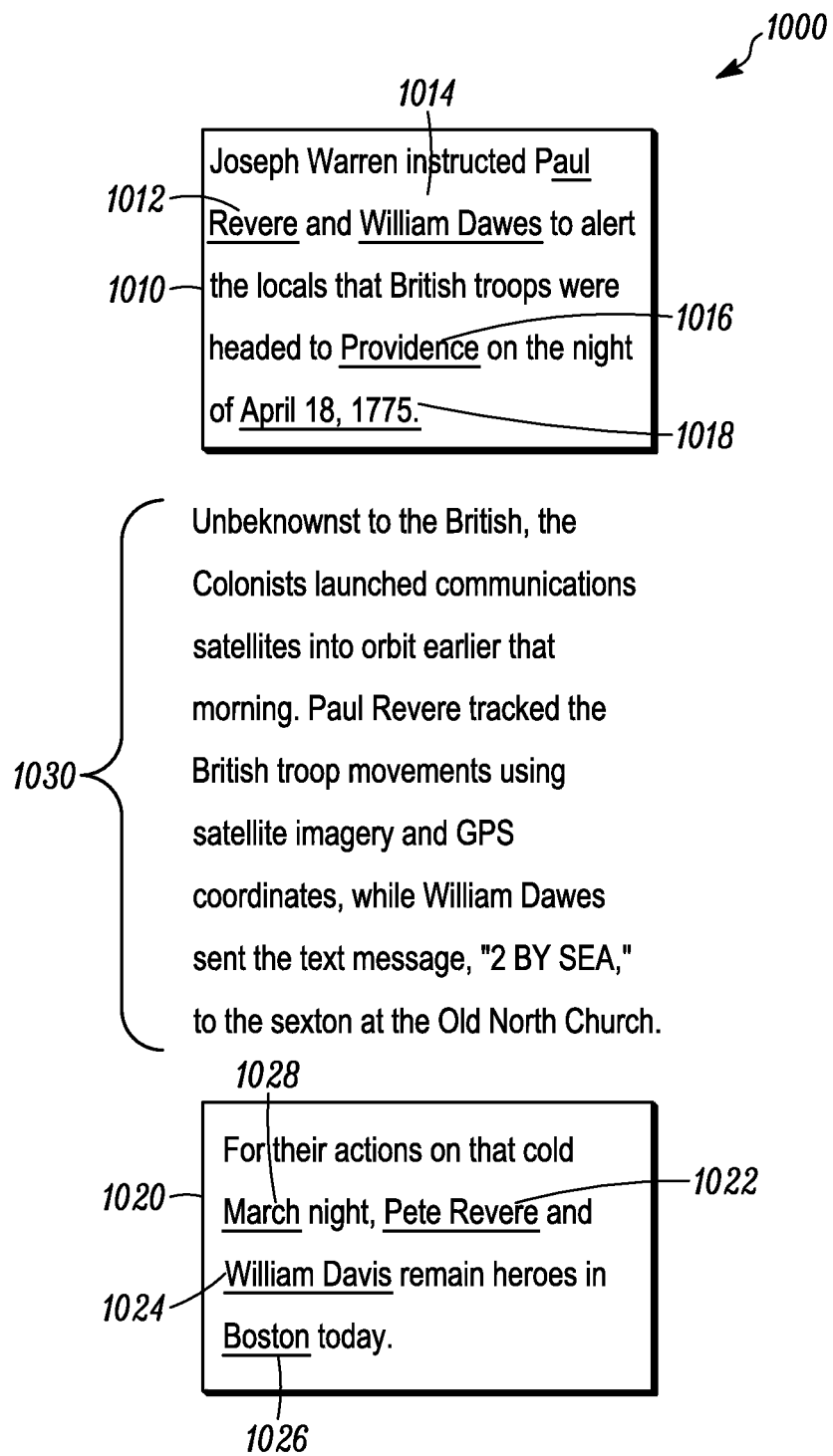
FIG. 10 is a block diagram of an internal work and established facts within internal works identified therein, in accordance with embodiments of the present disclosure.

Referring to FIG. 10, an internal work 1000 consisting of a piece of historical fiction and having three sections 1010, 1020, 1030 is shown. As is shown in FIG. 10, sections 1010, 1020 have been selected or otherwise designated by the author to be evaluated for consistency between established facts, as indicated by the boxes shown around the sections 1010, 1020, while section 1030 has not been selected.

As is shown in FIG. 10, established facts 1012, 1014, 1016, 1018 may be identified within section 1010, while established facts 1022, 1024, 1026, 1028 may also be identified within section 1020. Therefore, the contradictions between established facts 1012 and 1022 ("Paul Revere" and "Pete Revere"), between established facts 1014 and 1024 ("William Dawes" and "William Davis"), between established facts 1016 and 1026 ("Providence" and "Boston") and between established facts 1018 and 1028 ("Apr. 18, 1775" and "cold March night") may be identified and addressed according to one or more embodiments of the present disclosure. For example, alternate or replacement text may be recommended to address each of the contradictions, as is shown in FIGS. 4A and 4B, and one or more external resources may be consulted to determine which, if any, of the contradictory established facts is correct, as is shown in FIG. 9B.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, the systems and methods of the present disclosure may operate on any suitable hardware, including standard computing equipment such as desktops or laptops, as well as smartphones, and even on non-standard computing equipment such as autocues (e.g., teleprompters) or printers. The systems and methods of the present disclosure may also operate as free-standing software or as additions to existing software, such as word processors, electronic mail clients or any other like applications.

Moreover, the methods of the present disclosure may be repeated as many times as is necessary to fully evaluate an internal work for consistency between established facts. For example, where the systems and methods of the present disclosure are utilized in connection with word processing software, an internal work may be analyzed for consistency between established facts according to a first standard as the internal work is created, and according to a second standard after the internal work is complete. Additionally, the systems and methods may evaluate an internal work for consistency between internal facts in multiple stages. For example, established facts may be identified within an internal work as the internal work is created, and contradictions between established facts may be identified after the internal work is complete.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A non-transitory computer-readable medium having a computer-executable component for causing a computer system comprising at least one computer processor to perform a method for verifying an internal work, the method comprising:
   analyzing the internal work to identify a plurality of established facts in the internal work by the at least one computer processor;
   analyzing the internal work to identify a contradiction between at least two of the plurality of established facts by the at least one computer processor;
   deriving a formula for calculating confidence levels of contradictions between established facts by the at least one computer processor;
   calculating a confidence level of the contradiction between the at least two of the plurality of established facts according to the formula by the at least one computer processor;
   determining whether the confidence level exceeds a predetermined threshold by the at least one computer processor; and
   upon determining that the confidence level exceeds the predetermined threshold,
      generating information regarding the contradiction,
      wherein the information regarding the contradiction comprises a set of substitute text for one of the at least two of the plurality of established facts and at least one of:
         a location of a statement in the internal work on which the one of the at least two of the plurality of established facts is based;
         a proximity of the at least two of the plurality of established facts to one another within the internal work;
         a context of the contradiction; or
         a context of the internal work;

causing a display of at least some of the information regarding the contradiction on at least one computer display, wherein the at least some of the information regarding the contradiction comprises the set of substitute text;
receiving a selection of the set of substitute text from a user; and
replacing the one of the at least two of the plurality of established facts in the internal work with the set of substitute text.

2. The non-transitory computer-readable medium of claim 1, wherein analyzing the internal work to identify the plurality of established facts comprises:
identifying a word pair within the internal work by the at least one computer processor; and
establishing a fact regarding a first word of the word pair based on a second word of the word pair by the at least one computer processor.

3. The non-transitory computer-readable medium of claim 1, wherein the method further comprises:
determining a change to the internal work for addressing the contradiction by the at least one computer processor, wherein the information regarding the contradiction further comprises information regarding the change to the internal work.

4. The computer-readable medium of claim 1, wherein the formula is based at least in part on at least one of:
the location of the statement in the internal work on which the one of the at least two of the plurality of established facts is based;
the proximity of the at least two of the plurality of established facts to one another within the internal work;
the context of the contradiction; or
the context of the internal work.

5. A computer-implemented method comprising:
identifying an internal work stored in at least one database;
identifying a first fact in the internal work by at least one computer processor;
identifying a second fact in the internal work by the at least one computer processor;
determining whether a contradiction exists between the first fact and the second fact in the internal work by the at least one computer processor;
upon determining that the contradiction exists between the first fact and the second fact in the internal work,
generating a replacement set of text to address the contradiction between the first fact and the second fact in the internal work by the at least one computer processor;
storing information regarding the contradiction in the at least one database; and
causing a display of at least some of the information regarding the contradiction in at least one user interface on at least one computer display,
wherein the information regarding the contradiction comprises at least a portion of the replacement set of text and at least one of:
the first fact;
the second fact;
a location of a first statement in the internal work from which the first fact was identified;
a location of a second statement in the internal work from which the second fact was identified;
a proximity of the location of the first statement to the location of the second statement within the internal work;
a context of the contradiction; or
a context of the internal work;
receiving an instruction to replace the first statement in the internal work with the replacement set of text.

6. The computer-implemented method of claim 5, wherein the first fact comprises a first word pair,
wherein the second fact comprises a second word pair; and
wherein determining whether the contradiction exists between the first fact and the second fact in the internal work comprises:
determining whether a first word in the first word pair is related to a first word in the second word pair by the at least one computer processor, and
determining whether a second word in the first word pair is related to a second word in the second word pair by the at least one computer processor.

7. The computer-implemented method of claim 6, wherein the first word pair comprises a first adjective and a first noun,
wherein the second word pair comprises a second adjective and a second noun, and
wherein the contradiction exists if the first noun is related to the second noun and the first adjective is not related to the second adjective.

8. The computer-implemented method of claim 5, wherein identifying the first fact in the internal work comprises:
identifying a first noun in the internal work by the at least one computer processor; and
identifying a first adjective associated with the first noun by the at least one computer processor,
wherein identifying the second fact in the internal work comprises:
identifying a second noun associated with the first noun by the at least one computer processor; and
identifying a second adjective associated with the second noun by the at least one computer processor, and
wherein determining whether the contradiction exists between the first fact and the second fact comprises:
determining whether the second adjective is associated with the first adjective by the at least one computer processor.

9. The computer-implemented method of claim 5, further comprising:
receiving a selection of a portion of the internal work from at least one user by the at least one computer processor,
wherein identifying the first fact in the internal work comprises:
identifying the first fact in the portion of the internal work by the at least one computer processor, and
wherein identifying the second fact in the internal work comprises:
identifying the second fact in the portion of the internal work by the at least one computer processor.

10. The computer-implemented method of claim 5, further comprising:
upon determining that the contradiction exists between the first fact and the second fact,
calculating a confidence level for the contradiction according to a formula by the at least one computer processor.

11. The computer-implemented method of claim 10, wherein the formula is based at least in part on at least one of:
a factor relating to the location of at least one of the first statement or the second statement in the internal work;
a factor relating to the proximity of the location of the first statement to the location of the second statement within the internal work; or
a factor relating to a context of at least one of the first fact or the second fact.

12. The computer-implemented method of claim 5, wherein the at least one user interface comprises a request for a change to the internal work to remedy the contradiction.

13. The computer-implemented method of claim 5, wherein the at least one user interface comprises a recommendation to replace the first statement in the internal work with the set of replacement text to remedy the contradiction.

14. The computer-implemented method of claim 13, further comprising:
receiving a selection of at least one external reference from at least one user by the at least one computer processor,
wherein the set of replacement text is generated based at least in part on information in the at least one external reference.

15. The computer-implemented method of claim 14, wherein the external reference is one of a calculator, a calendar, a dictionary, an encyclopedia or a thesaurus.

16. The computer-implemented method of claim 5, further comprising:
partitioning the internal work into a first portion and a second portion by the at least one computer processor,
wherein identifying the first fact in the internal work comprises:
identifying the first fact in one of the first portion or the second portion, and
wherein identifying the second fact in the internal work comprises:
identifying the second fact in the one of the first portion or the second portion.

17. The computer-implemented method of claim 5, wherein the internal work comprises at least two volumes of text; and
wherein the first fact is identified in a first one of the at least two volumes of text; and
wherein the second fact is identified in a second one of the at least two volumes of text.

18. A computer system comprising:
a computer having at least one computer processor, wherein the computer is configured to at least:
receive a selection of at least one external resource;
receive a selection of at least a portion of a body of text within an electronic document;
identifying at least two established facts within the selected portion of the electronic document using the at least one computer processor;
determine whether a contradiction exists between the at least two established facts within the electronic document using the at least one computer processor;
upon determining that the contradiction exists between the at least two established facts,
determine whether the at least one external resource comprises information regarding the contradiction;
upon determining that the at least one external resource comprises information regarding the contradiction,
generate a first change to the electronic document based at least in part on the information regarding the contradiction; and
cause a display of at least one first user interface on at least one computer display,
wherein the at least one first user interface comprises information regarding the first change to the electronic document to address the contradiction; and
receive a first instruction to implement the first change to the electronic document from at least one user over a network.

19. The computer system of claim 18, wherein the computer is further configured to at least:
calculate a confidence level of the contradiction according to a formula,
wherein the formula comprises at least one of:
a factor relating to a location of at least one of the at least two established facts within the electronic document,
a factor relating to a proximity of the at least two established facts within the electronic document, or
a factor relating to a context of at least one of the at least two established facts within the electronic document.

20. The computer system of claim 18, wherein the computer is further configured to at least:
upon determining that the at least one external resource does not comprise information regarding the contradiction,
cause a display of at least one second user interface on the at least one computer display,
wherein the at least one second user interface comprises a request for a second change to the electronic document to address the contradiction; and
receive information regarding the second change to the electronic document from the at least one user over the network; and
implement the second change to the electronic document.

* * * * *